(12) United States Patent
Vanderheyden

(10) Patent No.: US 9,824,714 B2
(45) Date of Patent: Nov. 21, 2017

(54) INTEGRATED REEL HUB AND MOTOR SHAFT ASSEMBLY FOR TAPE DRIVES

(71) Applicant: Oracle International Corporation, Redwood City, CA (US)

(72) Inventor: William Vanderheyden, Loveland, CO (US)

(73) Assignee: Oracle International Corporation, Redwood City, CA (US)

( * ) Notice: Subject to any disclaimer, the term of this patent is extended or adjusted under 35 U.S.C. 154(b) by 215 days.

(21) Appl. No.: 14/739,129

(22) Filed: Jun. 15, 2015

(65) Prior Publication Data

US 2015/0279413 A1 Oct. 1, 2015

Related U.S. Application Data

(62) Division of application No. 13/424,567, filed on Mar. 20, 2012, now Pat. No. 9,087,550.

(51) Int. Cl.
| | |
|---|---|
| *G11B 5/127* | (2006.01) |
| *H04R 31/00* | (2006.01) |
| *G11B 15/32* | (2006.01) |
| *G11B 23/037* | (2006.01) |
| *G11B 23/113* | (2006.01) |
| *B29C 45/14* | (2006.01) |
| *B29L 31/00* | (2006.01) |

(52) U.S. Cl.
CPC ........ *G11B 15/32* (2013.01); *B29C 45/14426* (2013.01); *G11B 23/037* (2013.01); *G11B 23/113* (2013.01); *B29L 2031/75* (2013.01)

(58) Field of Classification Search
CPC ..... G11B 23/037; G11B 15/32; G11B 23/113; B29C 45/14426; B29L 2031/75
See application file for complete search history.

(56) References Cited

U.S. PATENT DOCUMENTS

| | | | | |
|---|---|---|---|---|
| 6,039,536 | A * | 3/2000 | Van De Venne | F04D 29/263 415/216.1 |
| 6,279,845 | B1 | 8/2001 | Hemzacek | |
| 6,786,445 | B1 * | 9/2004 | Todd | G11B 23/044 242/548.2 |
| 8,107,190 | B2 * | 1/2012 | Ito | F16C 17/107 264/272.2 |
| 9,087,550 | B2 | 7/2015 | Vanderheyden | |
| 2008/0080976 | A1 * | 4/2008 | Cheng | F04D 25/062 416/174 |
| 2008/0173749 | A1 * | 7/2008 | Shiga | G11B 23/107 242/407 |
| 2013/0248631 | A1 | 9/2013 | Vanderheyden | |

* cited by examiner

*Primary Examiner* — Paul D Kim

(74) *Attorney, Agent, or Firm* — Marsh Fischmann & Breyfogle LLP; Jonathon A. Szumny

(57) ABSTRACT

An integrated reel hub and motor shaft assembly for a tape drive that limits axial and radial run-out of tape (e.g., magnetic, optical) relative to a read/write head assembly and the various errors (e.g., loading, tension, reading, writing, and the like) associated therewith. In one arrangement, a reel hub of a reel assembly is directly molded (e.g., via an injection molding process) onto and around an end of a drive or motor shaft of a drive assembly. As a result, a more consistent head to tape interface, greater tape tracking performance, increased track density, and the like may be achieved.

15 Claims, 5 Drawing Sheets

INTEGRATED REEL HUB AND MOTOR SHAFT ASSEMBLY FOR TAPE DRIVES

CROSS REFERENCE TO RELATED APPLICATIONS

This application is a divisional of U.S. patent application Ser. No. 13/424,567, now U.S. Pat. No. 9,087,550, entitled "METHOD OF FABRICATING AN APPARATUS FOR USE IN A TAPE DRIVE," and filed on Mar. 20, 2012, the entire contents of which is incorporated herein in its entirety as if set forth in full.

BACKGROUND

1. Field of the Invention

The present invention generally relates to the winding of tape around reels in a tape drive and, more particularly, to an integrated reel hub and motor shaft assembly and fabrication method therefore that reduce radial and axial run-out of the tape relative to the reel hub to limit position errors and head-to-tape spacing complications.

2. Relevant Background

Tape drives have been widely employed in industry for over thirty years due to their ability to store large amounts of data on a relatively small and inexpensive removable format. Typically, tape drives use a storage tape having a thin film of magnetic material which is wound between a pair of tape reels as data is transferred to or from the tape media via a read/write tape head assembly. In one arrangement, one of the reels (e.g., the "take-up" reel) is part of the tape drive while the other reel (e.g., the "cartridge" reel) is part of a removable cartridge. Upon insertion of the cartridge into the tape drive, the storage tape on the cartridge reel must be coupled to the take-up reel of the tape drive (e.g., via respective leaders). After coupling, the tape is unwound from the cartridge reel, moved past the tape head assembly and wound onto the take-up reel via a drive motor. Next, the tape is unwound from the take-up reel, moved past the tape head assembly and wound onto the cartridge. Subsequently, the storage tape must be uncoupled from the take-up reel, prior to removing the cartridge from the tape drive. In another arrangement, both reels are part of a cassette which is inserted into a tape drive and driven by a drive motor.

More recently, a popular trend is towards multi head, multi-channel fixed head structures with narrowed recording gaps and data track widths so that many linear data tracks may be achieved on a tape medium of a predetermined width, such as one-half inch width tape. To increase the storage density and reduce access time of magnetic tapes, data tracks on the tape are arranged with greater density and the tape is streamed by a tape head at increasingly faster rates.

However, increased storage density and linear speed can lead to higher error rates when reading and/or writing on the tape due to both "axial" and "radial" run-out. Axial run-out refers to lateral or transverse motion of the tape on the reel assembly relative to a head assembly in a tape drive as the tape streams by the head assembly, and is generally defined as the peak-to-peak distance of the undesirable movement (in-plane) of the tape perpendicular to its prescribed longitudinal direction of motion past the head assembly. Radial run-out refers to tension variations in the tape in a direction perpendicular to the axis of rotation of the reel assembly.

Often, axial and radial run-out are caused by various fabrication and assembly tolerances in the engagement between a reel assembly and a corresponding drive assembly (e.g., reel driver, drive shaft). If the engagement is imprecise because of an offset (e.g., in the axial and/or radial directions), the tape path may vary resulting in excess lateral tape motion and/or tension variations in the tape. Both axial and radial run-out can cause errors in the reading and/or writing process by limiting the degree to which a head assembly can locate a particular data track. As a result, axial and radial run-out and the ability to compensate for the same are major limiting factors in determining the minimum width of a track and the minimum spacing between tracks on the tape. As run-out is reduced, tracks may be stored more densely on the storage tape and storage tape capacity can be increased.

The common approach to limiting axial and radial run-out is by way of improving the fabrication and/or assembly tolerances of and/or between the reel and motor assemblies to allow for a more precise engagement between the same. In some arrangements, the reel and drive assemblies have corresponding apertures through which fasteners can be inserted and/or threaded to limit relative movement. In other arrangements, corresponding interlock components (e.g., teeth, splines, and the like) may be disposed on the reel and drive assemblies and which may respectively interlock to limit relative movement between the reel and drive assemblies. However, even relatively small mismatches in the matched features or teeth can cause run-out control and axial location difficulties. Furthermore, less than full engagement between the reel and drive assemblies can cause various types of tape loading or tension errors to occur and possibly lead to increased lateral tape motion. In this regard, the tolerance "stack-up" between the reel assembly, the drive assembly, and the like can cause various types of errors in reading and/or writing processes and hinder the pursuit of increased magnetic tape data density.

SUMMARY

Disclosed herein is an integrated reel and drive assembly that serves to reduce the aforementioned tolerance stack-up to further limit and reduce axial and radial tape run-out in tape drives and the various types of errors (e.g., loading, tension, reading, writing, and the like) associated therewith. Broadly, the disclosed arrangement includes a reel hub of a reel assembly that is precisely molded (e.g., injection molded) directly onto a motor shaft of a drive or motor assembly (e.g., as opposed to separately fabricating the reel hub and then securing the same to the motor shaft via bolts or other fasteners). In one arrangement, an inner surface of a central portion of the reel hub may be in direct contact (e.g., free of gaps) with an end of the motor shaft. For instance, the disclosed integrated assembly may form part of a take-up reel of a tape drive, where the take-up reel includes upper and lower flanges interconnected to opposing sides of the integrated reel hub that serve to contain the tape wound around the hub. The resulting integrated assembly is largely devoid of many of the fabrication and assembly tolerances associated with the need to interconnect a drive shaft and a separately fabricated reel hub. Thus, many of the above-mentioned errors can be limited or reduced leading to a more consistent head to tape interface, greater tape tracking performance, increased track density, and the like.

In one arrangement, a custom-designed mold (e.g., die) may be sized and shaped to allow for the molding of a reel hub onto the end of a drive shaft of a motor assembly. The mold may include a movable portion (e.g., platen) that is movable towards and away from a stationary portion (e.g., platen) so as to selectively form a reel hub cavity having the shape and size of the reel hub to be formed therebetween.

The movable portion may have an elongated aperture that is sized and shaped to receive the drive shaft so as to position an end of the drive shaft within the reel hub cavity upon the movable portion being moved into engagement with or at least adjacent to the stationary portion Any appropriate resin or material (e.g., thermosetting, thermoplastic) may be fed into the cavity (e.g., forced into the cavity as part of an injection molding process) and allowed to cool to harden into the configuration of the cavity and thus a reel hub. Upon cooling and hardening of the molding material, the integrated reel hub and drive shaft assembly may be removed from the mold (e.g., via separating the movable portion from the stationary portion and ejecting the integrated assembly from the movable portion) any appropriate portions of a rotor assembly (e.g., rotor part, ball bearing assembly, and/or the like) may be non-rotatably secured to (e.g., pressed over) the drive shaft.

For instance, the inner diameter of the aperture in the movable portion into which the drive shaft is placed may be substantially the same as (e.g., slightly larger than) an inner diameter of an aperture through the rotor part and ball bearing assembly that is to be pressed over the drive shaft. In other words, the outer surface of the drive shaft may be positioned relative to an inner surface of the aperture in the movable portion during the molding process in a manner that substantially mimics the positioning of the outer surface of the drive shaft relative to an inner surface of the rotor part and ball bearing assembly once the rotor part and ball bearing assembly are pressed over the drive shaft. In this regard, the reel hub may be more precisely molded over the end of the drive shaft so as to be spun by the drive shaft via the rotor part and ball bearing assembly in a manner that is substantially free of wobble and/or other inefficiencies In one aspect, a method for fabricating an apparatus for a tape drive includes providing a motor shaft having first and second ends and a rotational axis extending between the first and second ends, and molding a hub of a reel assembly to the first end of the motor shaft to form an integral piece with the motor shaft. After the molding, the hub includes an outer circumferential surface that is adapted to receive a tape pack thereon and a rotational axis that is collinear with the rotational axis of the motor shaft.

In another aspect, an apparatus for a tape drive includes a motor shaft having first and second ends and a rotational axis extending between the first and second ends, where the motor shaft is adapted to be rotated about the rotational axis by a motor. The integrated assembly also includes a reel hub having an outer circumferential surface, a central portion, and a rotational axis that is collinear with the rotational axis of the motor shaft and that passes through the central portion, where the outer circumferential surface is adapted to receive a tape pack thereon. The central portion of the reel hub has an inner surface that is in direct and rigid contact with the first end of the motor shaft.

In a further aspect, a tape drive includes a housing, a motor having a stator non-rotatably secured to the housing and a rotor rotatably interconnected to the stator, a motor shaft non-rotatably secured to the rotor, and a reel hub that is adapted to receive a tape pack thereon and that is molded directly onto an end of the motor shaft. Passing a current through a conductor of the motor generates a force that rotates the rotor which induces a corresponding rotation of the reel hub via the motor shaft.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein is a reel hub that is integrally formed onto an end of a motor or drive shaft so as to form a single integrated piece with the motor shaft. The integrated reel hub and motor shaft assembly may form part of a take-up reel in a tape drive to reduce or limit axial and radial run-out of magnetic tape as the tape is wound onto the reel hub. Integrating the reel hub and the motor shaft serves to eliminate or at least reduce much of the tolerance stack-up made up of various tolerances resident within the fabrication and assembly of current reel and motor assemblies. In this regard, many of the errors (e.g., loading, tension, reading, writing, and the like) resulting from both axial and radial tape run-out can be limited or reduced leading to a more consistent head to tape interface, greater tape tracking performance, increased track density, and the like.

Figure 1:
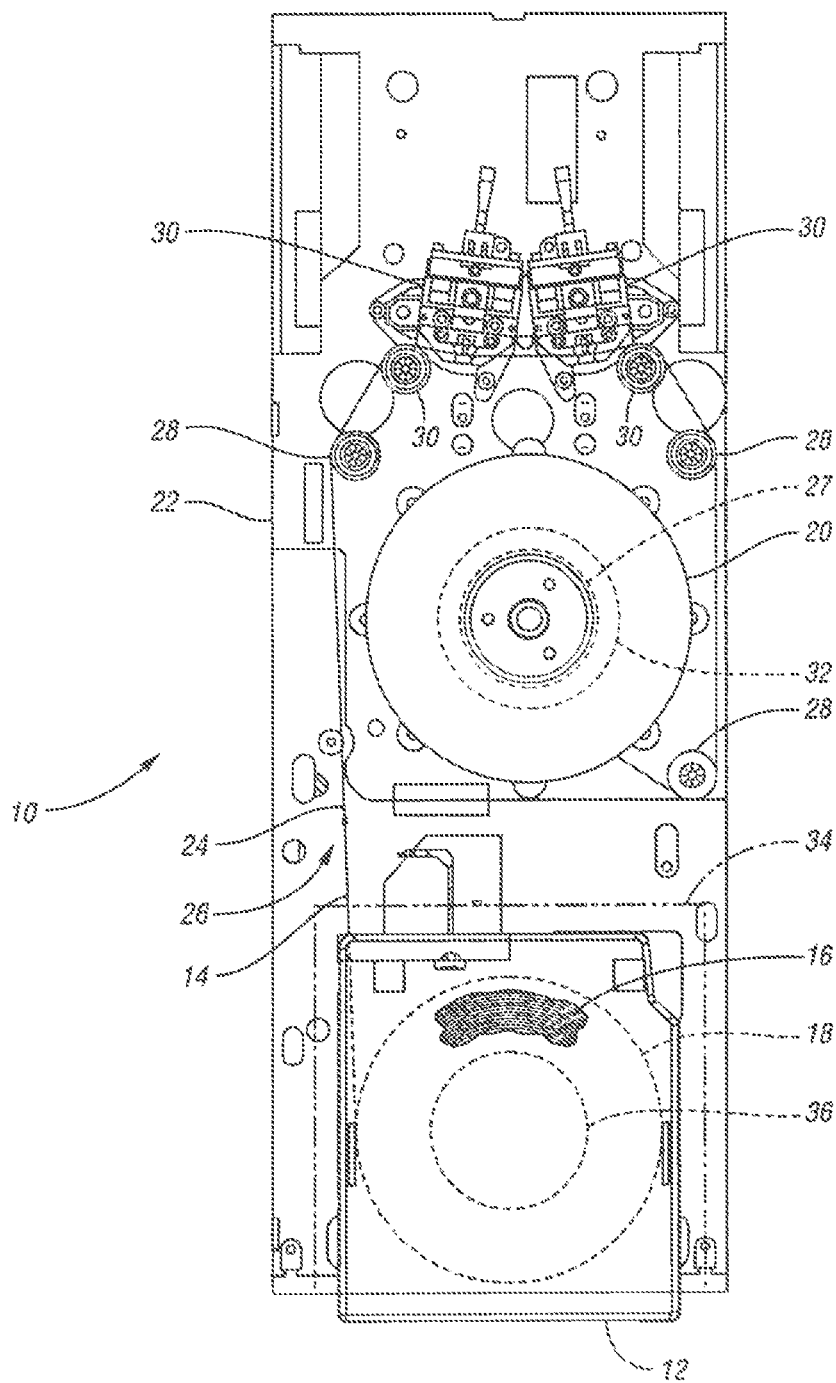
FIG. 1 is a plan view of a tape drive according to one embodiment.

Before discussing particulars of the disclosed integrated reel hub and motor shaft assembly in more detail, reference will initially be made to FIG. 1 which illustrates one type of tape drive 10 in which the disclosed integrated assembly may be implemented. Discussion of the tape drive 10 of FIG. 1 is merely provided to assist the reader in understanding one specific context in which the disclosed integrated assembly can be used. In this regard, it should be understood that the disclosed integrated assembly can be utilized in numerous other contexts (e.g., different types of tape drives, cartridges, cassettes, and the like) where reduction of axial and/or radial tape run-out is desired.

Broadly, the tape drive 10 is operable to write data to and/or read data from a supply reel 18 of tape 16 (e.g., magnetic tape) of a tape cartridge 12. The tape drive 10 may have a take-up reel 20 that is rotatably supported on a drive body or housing 22. A drive leader 24 of the take-up reel 20 may be attachable to a cartridge leader 14 of the tape cartridge 12 so as to pull the cartridge leader 14 and tape 16 along a tape path 26 to the take-up reel 20. The drive leader 24, cartridge leader 14 and tape 16 are configured to wrap around a reel hub 27 of the take-up reel 20 such that the tape 16 and leaders 14 and 24 form a tape pack.

The tape drive 10 may further include one or more guide members, such as rollers 28, for guiding movement of the drive leader 24, cartridge leader 14 and tape 16 along the tape path 26. Additionally, the tape drive 10 may also include one or more magnetic heads 30 (e.g., a "head assembly") for performing read and/or write operations on the tape 16, a motor 32 for driving the take-up reel 20 (e.g., having a stator that is non-movably secured to the housing 22, and a rotor that is rotatably positioned relative to the stator and that is rotated upon passing a current through a conductor of the stator), and a cartridge receiver 34 for receiving the tape cartridge 12. Furthermore, the cartridge receiver 34 may include a motor 36 that is configured to drive the supply reel 18 of the tape cartridge 12. Rollers 28, magnetic heads 30, motors 32 and 36, and cartridge receiver 34 may be mounted in and supported by the housing 22.

Figure 2:
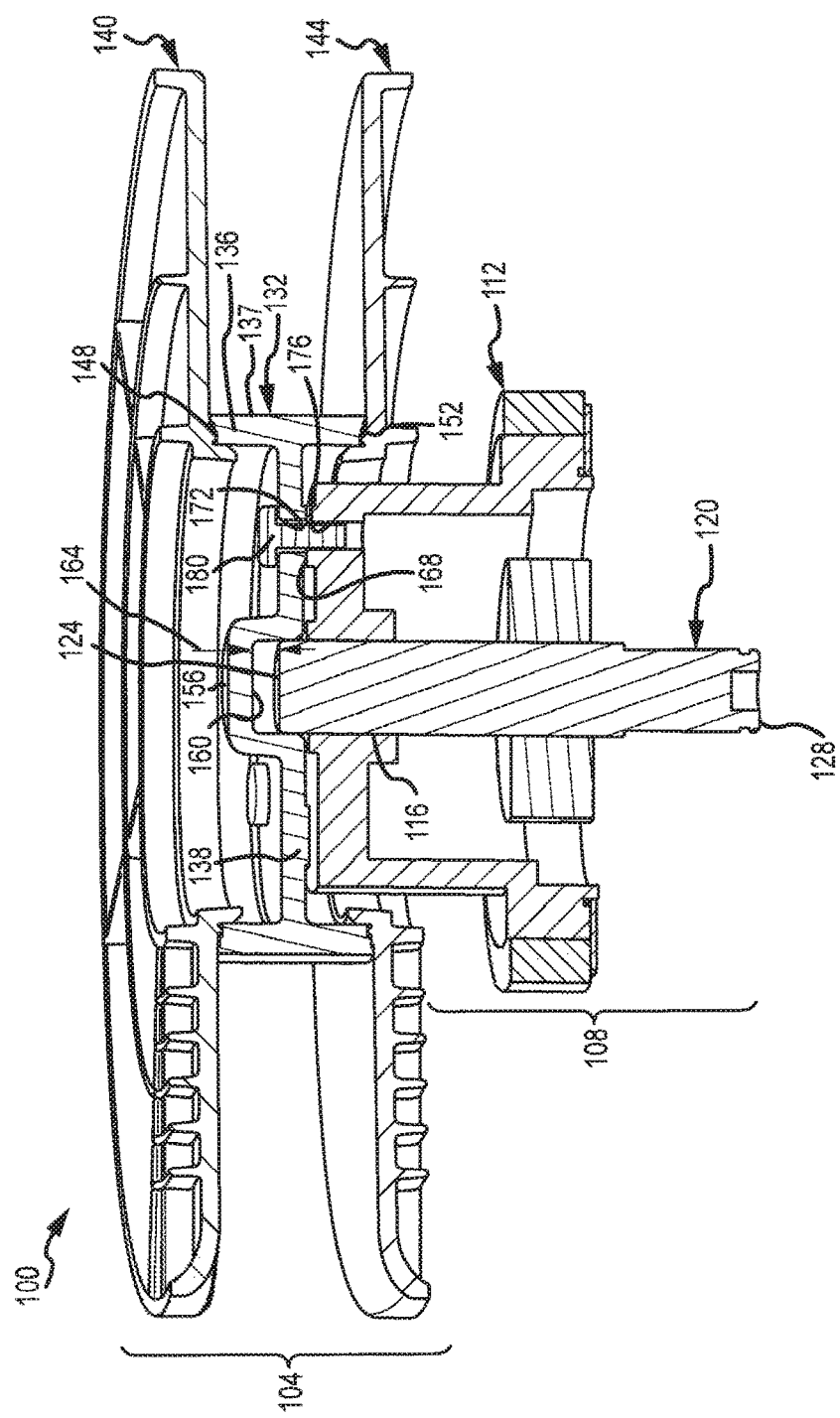
FIG. 2 is a partial perspective, sectional view illustrating the engagement between a take-up reel and a separate rotor assembly of a motor assembly that is adapted to rotate the take-up reel according to the prior art.

With reference now to FIG. 2, a partial perspective, sectional view of an arrangement 100 made up of a take-up reel assembly 104 and a rotor assembly 108 according to the prior art is illustrated. The rotor assembly 108 includes a rotor 112 having a central aperture 116 through which a motor shaft 120 having opposed first and second ends 124, 128 is received and non-movably (rigidly) secured or positioned. The rotor assembly 108 forms part of a motor (not shown) having a stator assembly (not shown) that, when energized with a current, is adapted to induce rotation of the rotor assembly 108. The take-up reel assembly 104 includes a reel hub 132 having a circumferential wall 136 with an outer surface 137 on which a tape pack (i.e., length of tape, not shown) may be wound, in addition to a central plate 138 that is generally perpendicularly disposed relative to the circumferential wall 136. Furthermore, first and second flanges 140, 144 are respectively secured to first and second opposing sides 148, 152 of the reel hub 132 (e.g., opposed sides of the circumferential wall 136) that serve to contain the tape pack therebetween.

To secure the take-up reel assembly 104 to the rotor assembly 108 (to allow the rotor assembly to induce a corresponding rotation of the take-up reel assembly 104), a number of corresponding engagement components or features are provided on the arrangement 100. First, the central plate 138 of the reel hub 132 includes a raised, central portion 156 having a cavity 160 therewithin that is sized and shaped to be located over the first end 124 of the motor shaft 120 to center the take-up reel assembly 104 over the rotor assembly 108. Furthermore, the central plate 138 of the reel hub 132 and a top surface 168 of the rotor 112 include a number of pairs of aligned apertures 172, 176 through which respective fasteners 180 (e.g., bolts) may be threaded or otherwise inserted to non-rotatably secure the take-up reel assembly 104 to the rotor assembly 108.

Previous reel/motor arrangements, such as the arrangement 100 of FIG. 2, introduce a number of inefficiencies and design flaws leading to axial and radial run-out of the tape pack and resultant errors in loading, tension, reading, writing, and the like. As seen in FIG. 2, a gap or clearance 164 must be left between the central portion 156 of the reel hub 132 and the first end 124 of the motor shaft 120 to allow for relative movement between the motor shaft 120 and the reel hub 132 during fastening of the reel hub 132 to the rotor 112.

However, the clearance 164 necessarily introduces a tolerance into the assembly and engagement of the central portion 156 and the first end 124 motor shaft which can cause run-outs of the tape pack as it moves through the tape drive. Furthermore, the various pairs of apertures 172, 176 and respective fasteners 180 introduce additional assembly tolerances between the central plate 138 and the rotor 112. In conjunction with the aforementioned assembly tolerances, numerous tolerances inherently exist in the fabrication of the various components of the arrangement 100 (e.g., in the dimensions of the reel hub 132, the rotor 112, the motor shaft 120, and the like). The overall tolerance stack-up of the arrangement 100 can lead to axial and radial run-out of the tape pack and various resultant tape drive errors in loading, tension, reading, writing, and the like.

Figure 3:
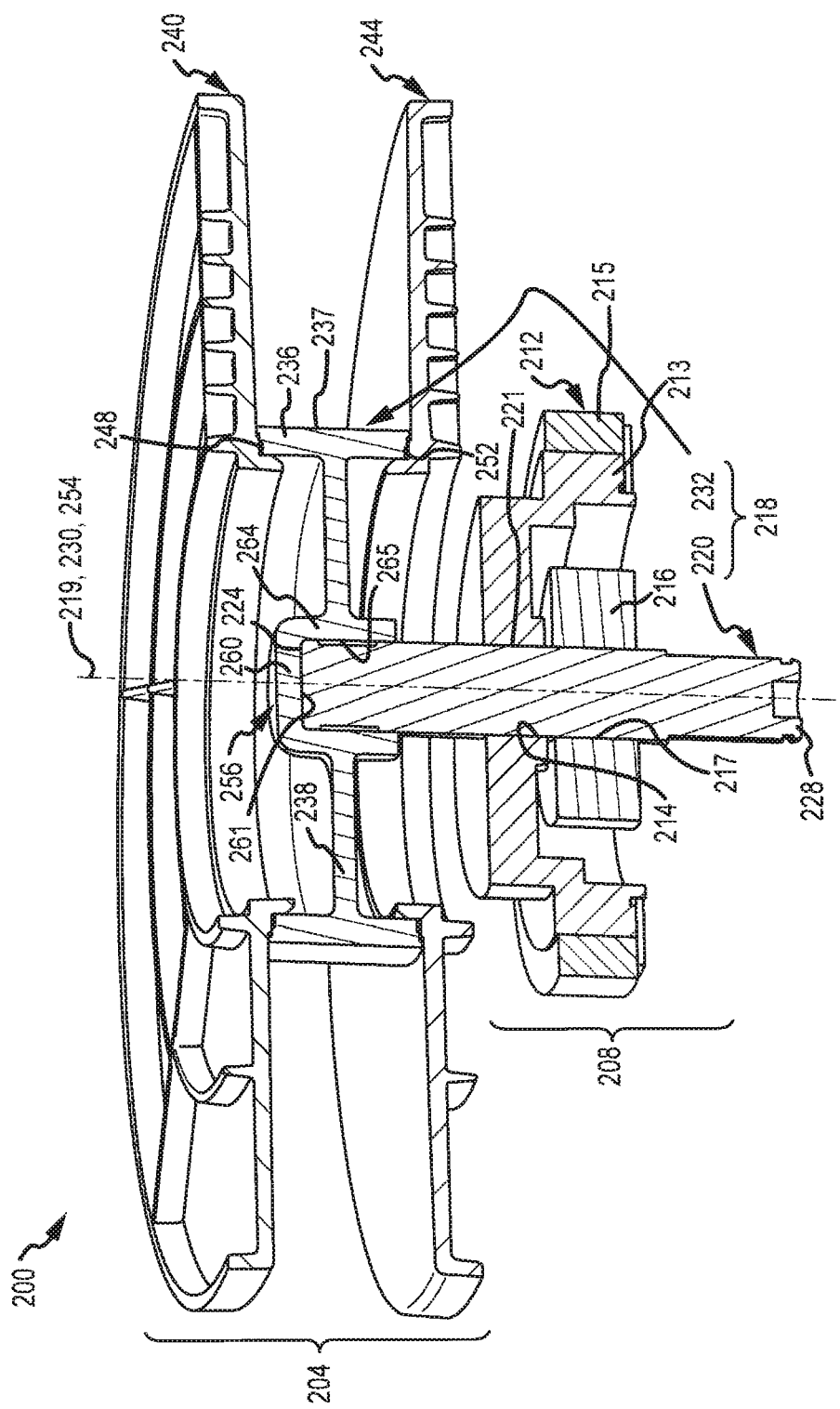
FIG. 3 is a partial perspective, sectional view illustrating an integrated reel hub of a take-up reel and a motor shaft of a motor assembly that may be mounted within the tape drive of FIG. 1, according to one embodiment.

In this regard, FIG. 3 illustrates an arrangement 200 made up of a take-up reel assembly 204 and a rotor assembly 208, where the arrangement 200 includes an integrated assembly or apparatus 218 (made up of a reel hub 232 directly molded onto a motor shaft 220, discussed in more detail below) that serves to eliminate or at least reduce many of the above-discussed assembly and fabrication tolerances in previous designs and the attendant errors associated therewith. For instance, the rotor assembly 208 may include a rotor 212 having a rotor part 213 with a central aperture 214 along with a magnet or magnetic assembly 215 secured about an outer surface of the rotor part 213. The rotor assembly 208 may also include a ball bearing assembly 216 having a central aperture 217. The central apertures 214, 217 of the rotor part 213 and ball bearing assembly 216 may be pressed over an outer (e.g., circumferential) surface 221 of a motor shaft 220 (having opposed first and second ends 224, 228) so as to be non-movably (e.g., non-rotatably) positioned relative thereto. For instance, the inner diameters of the central apertures 214, 217 may be the same as or slightly larger than the outer diameter of the motor shaft 220. The rotor assembly 208 forms part of a motor (not shown) having a stator assembly (not shown) that, when energized with a current, is adapted to induce rotation of the rotor 212 and thus the motor shaft 220 about respective collinear rotational axes 219, 230.

The take-up reel assembly 204 includes a reel hub 232 having a circumferential wall 236 with an outer surface 237 on which a tape pack (not shown) may be wound, in addition to a central wall or plate 238 that may be generally perpendicularly disposed relative to the circumferential wall 236. Furthermore, first and second flanges 240, 244 may be respectively secured to first and second opposing sides 248, 252 of the reel hub 232 (e.g., opposed sides of the circumferential wall 236) that serve to contain the tape pack therebetween. Rotation of the rotor 212 about its rotational axis 219 causes a corresponding rotation of the take-up reel assembly 204 about a corresponding rotational axis 254 via the motor shaft 220, where the various rotational axes 219, 230, 254 are collinear.

In contrast to previous designs that include various types of engagement features that attempt to align and non-rotatably secure a rotor assembly or other portion of a motor (e.g., motor shaft) to a separately fabricated reel hub, the arrangement 200 of FIG. 3 includes the integrated assembly 218 which eliminates or at least limits the need for fasteners, gaps, and the like between the reel hub and the drive shaft of a motor. Specifically, the integrated assembly 218 includes the motor shaft 220 and the reel hub 232, where the reel hub 232 is directly molded or otherwise initially fabricated directly over the motor shaft 220 so as to form a single, integral, rigid piece with the motor shaft 220. For instance, the central portion 256 of the reel hub 232 may include a base wall 260 having an inner surface 261 that is adapted to directly contact the first end 224 of the motor shaft 220. The central portion 256 may also include a circumferential wall 264 having a surface 265 that is adapted to directly contact the outer surface 221 of the motor shaft 220. Of note, the integrated assembly 218 may be free of gaps or clearances between the central portion 256 of the reel hub 232 and the motor shaft 220 which at least largely eliminates the above-discussed tolerances of previous assemblies. Furthermore, the integrated assembly 218 may be free of any fasteners extending between the reel hub 232 and the rotor 212. In this regard, the various inherent tolerances associated with fabricating and aligning apertures on the central plate 238 of the reel hub 232 and the rotor 212 may be eliminated or at least limited.

Figure 4:
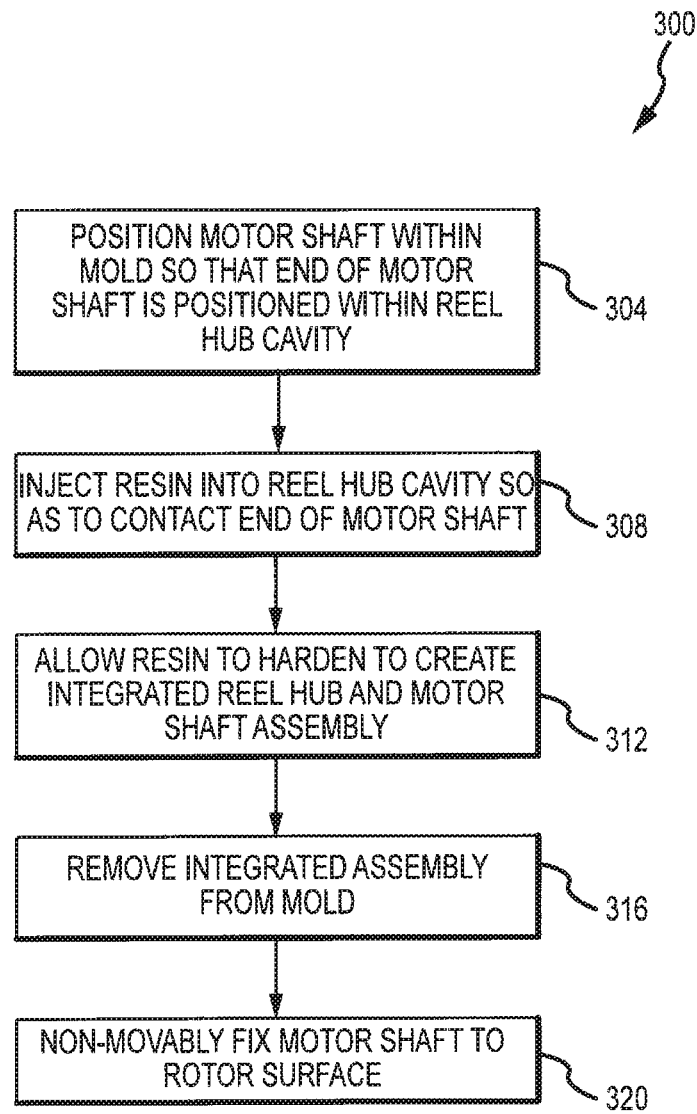
FIG. 4 is a flow diagram illustrating a method of fabricating the integrated assembly of FIG. 3, according to one embodiment

Turning to FIG. 4, a method 300 of fabricating an integrated assembly (e.g., such as the integrated assembly 218 of FIG. 3) is illustrated. In conjunction with a discussion of the fabrication method 300, reference will also be made to the die or mold 400 of FIG. 5 which may be used as part of the fabrication method 300 (portions of the mold 400 have been removed for clarity). At 304, a motor shaft 404 may be positioned within the mold 400 so that an end 405 of a motor shaft 404 is positioned within a reel hub cavity 412 of the mold 400, where the reel hub cavity 412 has a shape and dimensions of a desired reel hub to be fabricated (e.g., reel hub 232 of FIG. 3). The mold 400 may include a stationary portion or platen 408 that makes up one side of the reel hub cavity 412 and a movable portion or platen 409 that is movable along tie rods or the like (not shown) towards the stationary platen 408 so as to exert a clamping pressure against resin passed (e.g., injected) into the reel hub cavity 412.

For instance, the movable platen 409 may include an elongated aperture 411 having an inner diameter that is slightly larger than (e.g., on the order of hundredths or thousandths of an inch) an outer diameter of the motor shaft 404 to allow the motor shaft 404 to be inserted and positioned therein so that the motor shaft 404 is substantially free of the ability to move laterally within the aperture 411. In one arrangement, the inner diameter of the aperture 411 may be substantially the same as (e.g., slightly larger than) the inner diameter of the central aperture of the rotor into which the drive shaft 404 is to be placed after the molding process (e.g., central apertures 214, 217 in FIG. 3). The movable platen 409 may also include a surface 413 formed at a bottom of the aperture 411 that is adapted to support the drive shaft 404 (a second end 414 of the drive shaft 404 opposed to the end 405) in a manner so that the end 405 of the drive shaft 404 may protrude into the reel hub cavity 412 when the movable platen 409 is moved and positioned against or adjacent the stationary platen 408. In one arrangement, the reel hub cavity 412 may include a circumferential wall section 416 (e.g., corresponding to circumferential wall 236 of FIG. 3), a central plate section 420 (e.g., corresponding to central plate 238 of FIG. 3), and a central portion section 424 (e.g., corresponding to central portion 256 of FIG. 3). As shown, the end 405 of the drive shaft 404 may be positioned within the central portion section 424 of the reel hub cavity 412.

Figure 5:
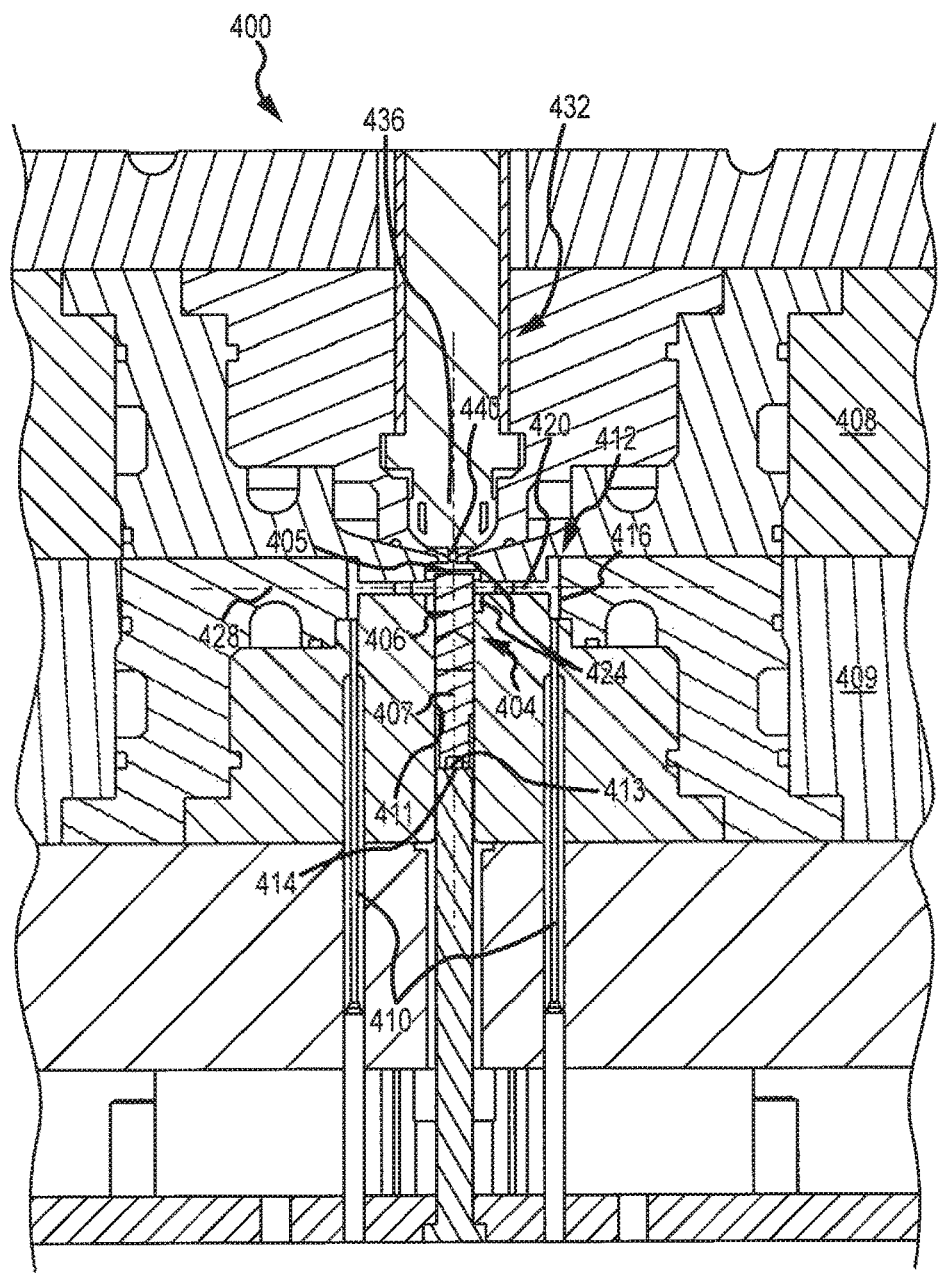
FIG. 5 is a sectional view of a portion of a die that may be used to directly mold the reel hub of FIG. 3 onto an end of the motor shaft, according to one embodiment.

With reference back to FIG. 4, the method 300 may include injecting 308 any appropriate resin into the reel hub cavity 412 so as to come into direct contact with the end 405 and circumferential sidewall 406 of the motor shaft 404. For instance, FIG. 5 illustrates a portion of a hot runner system 432 that is designed to store or contain resin (e.g., molten plastic, not shown) received from a barrel (not shown). The hot runner system 432 may include a nozzle 436 positioned adjacent an opening 440 into the reel hub cavity 412 so as to forcibly inject the resin into each of the circumferential wall section 416, central plate section 420, and central portion section 424 of the reel hub cavity 412 and into contact with the end 405 and circumferential sidewall 406 of the motor shaft 404. While not shown, the hot runner system 432 and barrel may include and/or be associated with any appropriate components that allow for the forcible injection of the resin into the reel hub cavity 412 (e.g., heater, hopper with raw plastic, reciprocating screw, drive motor, and the like).

At 312, the method 300 may include allowing the resin to cool and harden within the reel hub cavity 412 about the end 406 and circumferential sidewall 406 of the motor shaft 404 to create an integrated reel hub and motor shaft assembly. In conjunction with allowing 312 the resin to cool, the movable platen 409 may be clamped against the stationary platen 408 so as to limit the high pressure injected resin from forcing the stationary and movable platens 408, 409 apart before the resin has fully cooled. At 316, the integrated assembly (e.g., the reel hub 232 and motor shaft 220 of FIG. 3) may be removed from the mold 400. For instance, the movable platen 409 may be moved away from the stationary platen 408 and then the integrated assembly may be separated from the movable platen 409 via ejector pins 410 (see FIG. 5). Once the integrated assembly has been removed from the mold, the central aperture of a rotor may be appropriate pressed over the drive shaft 404 so as to be non-rotatable relative to the drive shaft 404. With reference to FIG. 3, for instance the central apertures 214, 217 of the rotor part 213 and ball bearing assembly 216 may be pressed over the drive shaft so that the inner surfaces of the central apertures 214, 217 are in non-rotatable contact with the outer surface of the drive shaft (e.g., so that rotation of the rotor part 213 and ball bearing assembly 216 causes a corresponding rotation of the drive shaft 220/404 and the reel hub 232. At any appropriate time, upper and lower flanges 240, 244 may be appropriately secured to the reel hub 232 and the apparatus 200 may be appropriately secured within a tape drive for acceptance of a tape pack.

Use of the mold 400 allows the end 405 and at least a portion of a circumferential sidewall 406 of the motor shaft 404 to be substantially precisely centrally positioned within the central portion section 424 of the reel hub cavity 412, and thus the central portion 256 of the reel hub 232 to be formed. In one regard, integrally molding the reel hub 232 onto the motor shaft 220 allows a longitudinal and rotational axis 407/230 of the motor shaft 404/220 (as well as a rotational axis 219 of rotor 212) to be perpendicularly oriented relative to a plane 428 along which the central plate section 420 of the reel hub cavity 412 is aligned (and thus along which the central plate 238 of the reel hub 232 is aligned). As a result, the central and circumferential walls 238, 236 may be allowed to rotate or spin substantially free of wobble which limits run-out of the tape pack as it is wound onto the take-up reel 204. Furthermore, the method 300 and/or mold 400 advantageously allow the reel hub 232 to be directly molded onto the motor shaft 220 in a manner that is free of fasteners, apertures, gaps, and the like which would otherwise inherently introduce a substantial tolerance stack-up leading to axial and radial run-out of the tape pack and resultant errors in loading, tension, reading, writing, and the like.

It will be readily appreciated that many additions and/or deviations may be made from the specific embodiments disclosed in the specification without departing from the spirit and scope of the invention. For instance, while the disclosed integrated assembly has been discussed primarily in the context of take-up reels for tape drives, it is envisioned that the integrated assembly may be used to construct other types of reels or drums that are operable to accept tape packs (e.g., magnetic, optical, and the like). Furthermore, while the disclosed method of manufacturing the integrated assembly was in the context of an injection molding process, it will be readily appreciated that other types of processes may also be used (e.g., compression molding, resin transfer molding, and the like). The illustrations and discussion herein has only been provided to assist the reader in understanding the various aspects of the present disclosure. Furthermore, one or more various combinations of the above discussed arrangements and embodiments are also envisioned.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

What is claimed is:

1. An apparatus for a tape drive, comprising:
a motor shaft having first and second ends and a rotational axis extending between the first and second ends, wherein the motor shaft is adapted to be rotated about the rotational axis by a motor; and
a reel hub having an outer circumferential surface, a central portion, and a rotational axis that is collinear with the rotational axis of the motor shaft and that passes through the central portion, wherein the outer circumferential surface is adapted to receive a tape pack thereon, and wherein the central portion of the reel hub comprises an inner surface that is in direct and rigid contact with the first end of the motor shaft, and wherein the inner surface extends across the rotational axis of the motor shaft.

2. The apparatus of claim 1, further comprising:
a rotor comprising a central aperture and a rotational axis passing through the central aperture, wherein the motor shaft is non-rotatably secured to the rotor via the central aperture, wherein the rotational axes of the rotor, motor shaft and reel hub are all collinear, and wherein rotation of the rotor via a corresponding stator assembly induces a corresponding rotation of the reel hub via the motor shaft.

3. The apparatus of claim 1, wherein the motor shaft comprises an outer circumferential surface extending between the first and second ends, and wherein the central portion of the reel hub is molded onto at least a portion of the outer circumferential surface of the motor shaft.

4. The apparatus of claim 3, wherein the inner surface of the central portion of the reel hub that is in direct and rigid contact with the first end of the motor shaft is disposed on a base wall of the central portion, and wherein the central portion of the reel hub includes a circumferential wall that is molded onto the portion of the outer circumferential surface of the motor shaft.

5. The apparatus of claim 4, wherein the circumferential wall of the central portion is perpendicular to the base wall of the central portion.

6. The apparatus of claim 5, wherein the apparatus is free of gaps between the base wall of the central portion and the first end of the motor shaft.

7. The apparatus of claim 6, wherein the apparatus is free of gaps between the circumferential wall of the central portion and the outer circumferential surface of the motor shaft.

8. The apparatus of claim 4, wherein the reel hub further includes a central plate interconnecting the circumferential wall of the central portion to the outer circumferential surface of the reel hub.

9. The apparatus of claim 8, wherein the central plate is perpendicular to the circumferential wall of the central portion and the outer circumferential surface of the reel hub.

10. The apparatus of claim 8, wherein the central plate is perpendicular to the rotational axis of the reel hub.

11. The apparatus of claim 8, wherein the circumferential wall of the central portion is disposed above and below the central plate.

12. The apparatus of claim 1, wherein the apparatus is free of gaps between the central portion of the reel hub and the motor shaft.

13. The apparatus of claim 1, wherein the central portion of the reel hub is directly molded onto the first end of the motor shaft to provide the direct and rigid contact.

14. An apparatus for a tape drive, comprising:
a motor shaft having first and second ends and a rotational axis extending between the first and second ends, wherein the motor shaft is adapted to be rotated about the rotational axis by a motor;
a reel hub having an outer circumferential surface, a central portion, and a rotational axis that is collinear with the rotational axis of the motor shaft and that passes through the central portion, wherein the outer circumferential surface is adapted to receive a tape pack thereon, and wherein the central portion of the reel hub comprises an inner surface that is in direct and rigid contact with the first end of the motor shaft; and
a rotor comprising a central aperture and a rotational axis passing through the central aperture, wherein the motor shaft is non-rotatably secured to the rotor via the central aperture, wherein the rotational axes of the rotor, motor shaft and reel hub are all collinear, wherein rotation of the rotor via a corresponding stator assembly induces a corresponding rotation of the reel hub via the motor shaft, and wherein the apparatus is free of fasteners extending between the reel hub and the rotor.

15. An apparatus for a tape drive, comprising:
a motor shaft having first and second ends and a rotational axis extending between the first and second ends, wherein the motor shaft is adapted to be rotated about the rotational axis by a motor; and
a reel hub having an outer circumferential surface, a central portion, and a rotational axis that is collinear with the rotational axis of the motor shaft and that passes through the central portion, wherein the outer circumferential surface is adapted to receive a tape pack thereon, and wherein the central portion of the reel hub comprises an inner surface that is in direct and rigid contact with the first end of the motor shaft, wherein the reel hub further comprises first and second opposed laterally opposed sides, and wherein the apparatus further comprises:
a first flange member secured to the first opposed side of the reel hub; and
a second flange member secured to the second opposed side of the reel hub, wherein the first and second flange members are adapted to contain the tape pack therebetween.

* * * * *

UNITED STATES PATENT AND TRADEMARK OFFICE
CERTIFICATE OF CORRECTION

PATENT NO. : 9,824,714 B2  
APPLICATION NO. : 14/739129  
DATED : November 21, 2017  
INVENTOR(S) : Vanderheyden et al.

Page 1 of 1

It is certified that error appears in the above-identified patent and that said Letters Patent is hereby corrected as shown below:

In the Specification

In Column 3, Line 5, delete "portion" and insert -- portion. --, therefor.

In the Claims

In Column 9, Line 63, in Claim 1, after "thereon," delete "and".

Signed and Sealed this  
Twenty-fourth Day of July, 2018

Andrei Iancu  
*Director of the United States Patent and Trademark Office*